Nov. 16, 1937.   U. CIAMBERLINI   2,099,385

PNEUMATIC TACHOMETER WORKING INDEPENDENTLY OF THE EXTERNAL PRESSURE

Filed June 17, 1936

INVENTOR:
UGO CIAMBERLINI
BY Haseltine, Lake & Co.
ATTORNEYS

Patented Nov. 16, 1937

2,099,385

UNITED STATES PATENT OFFICE 2,099,385

PNEUMATIC TACHOMETER WORKING INDEPENDENTLY OF THE EXTERNAL PRESSURE

Ugo Ciamberlini, Rome, Italy

Application June 17, 1936, Serial No. 85,810
In Italy October 5, 1935

2 Claims. (Cl. 264—14)

The object of the present invention is a pneumatic tachometer of the type in which the indications are transmitted at a distance by means of pressure above or below atmospheric pressure produced in a tube during the rotation of a rotary pump connected with the shaft of which it is desired to count the number of revolutions, said pump being inserted into the said tube, which at its two ends communicates with an air gauge disposed at the place at which the reading is to be made. These tachometers have however, as it is known, the drawback of supplying indications that are influenced by the pressure existing outside the instrument, so that they can only be used in connection with stationary motors. If the tachometer is intended to operate mounted on an aircraft, it is obvious that its indications would be affected by the height thereof, as it is not possible to maintain a perfect tightness at the point in which the rotating driving shaft of the pump emerges from its casing bearing for its connection with the shaft of which it is desired to ascertain the speed of rotation.

In order to prevent this inconvenience, the present invention provides a special air tight transmission inserted between the shaft of the pump and the shaft the number of turns of which must be measured, such transmission being completely isolated from the outside so as to prevent any perturbing action therefrom.

According to the invention, the pump, inserted in the closed tube leading to the air gauge, receives its movement by means of a straight rod, provided at a certain point of its length with a spherical articulated bearing which oscillates on a support, so as to describe in its movement a conical surface, said rod being connected at its ends with two discs mounted respectively one on the pump shaft and the other on the shaft, the rotating speed of which is to be measured. The seat for the spherical articulated bearing is provided by an intermediate diaphragm, and, as during its movement, the rod does not rotate round its own axis, the spherical articulated bearing, which like other supports, might give rise to errors owing to the influence of external pressure, is isolated with respect to the exterior by means of a rubber cap, suitably deformable, one circular edge of which is gripped against the intermediate diaphragm carrying the articulated bearing, and the other circular edge against one end of the transmission rod. In such way the circuit containing the pump remains completely isolated from the outside, and can supply exact indications also at various heights, and generally when varying the external pressure, as the density of the air contained in it remains always constant, being independent of the external pressure and temperature.

The annexed drawing shows schematically and by way of example one form of construction of the tachometer according to the invention, in which the difference of pressure in the branches of the tube is obtained by means of a rotary pump.

Figure 1:
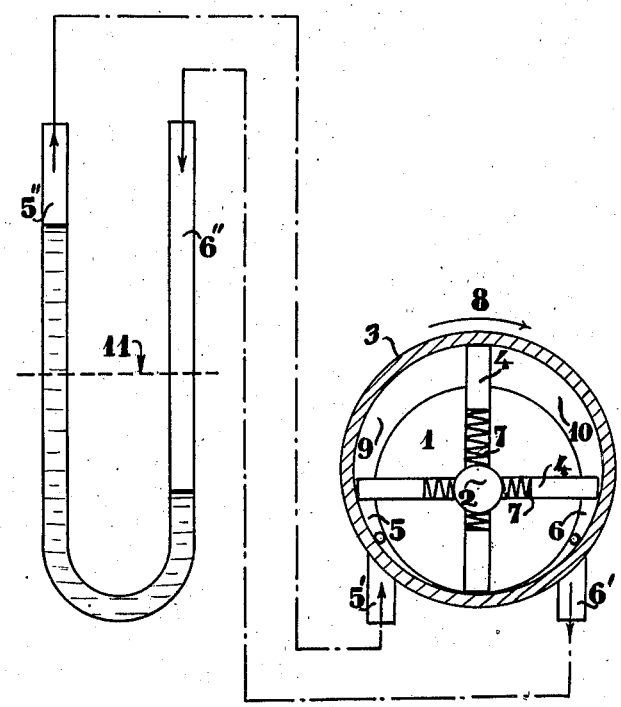
Fig. 1 shows a cross section through a sliding vane type pump inserted in a closed circuit, and carrying, at the point where the reading is to be made, a U gauge partially filled with mercury or with any other suitable liquid.
Figure 2:
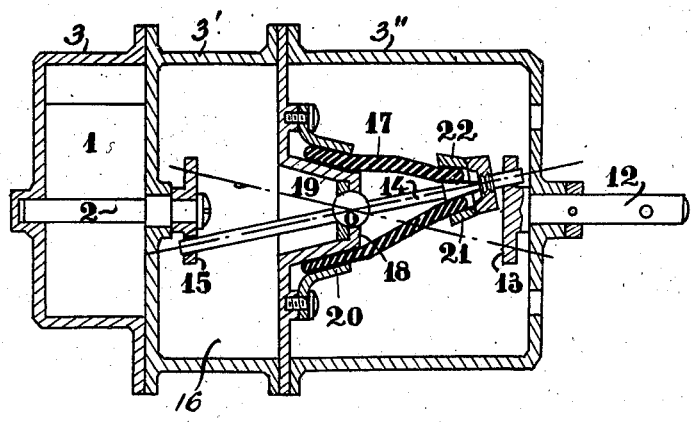
Fig. 2 shows in longitudinal section the group comprising the pump and its driving means and the air-tight transmission interposed between them.

As shown in the drawing, the pump is formed with a cylindrical rotor 1, keyed on a shaft 2 rotating therewith, said body 1 being tangent to the inner surface of the casing 3, and eccentric with respect to the latter. The transmission casing is made up of three separate sections 3, 3' and 3", separated by diaphragms, forming a central chamber 16. Radial blades 4 are housed in suitable radial grooves provided on the rotating body 1, four of these are shown in the example illustrated in the drawing, said radial blades 4 sliding in the grooves being maintained constantly in contact against the housing, by means of as many springs 7 tending to push them outwards. These blades divide the internal free space of the pump into four chambers, that is, two larger chambers 9 and 10 and two smaller chambers 5 and 6, which are those adjacent to the contact radius, these latter communicating through the tubes 5' and 6', with the two branches of the gauge tube 5"—6", the liquid of which stands at the same level 11 when the pump is at rest. When the pump rotates, in the direction of arrow 8, a depression is produced in the tube 5', and an over-pressure in the tube 6', so that the liquid rises in one of the two legs of the gauge and descends in the other leg as shown in the figure.

The special air-tight transmission between the chamber 16 formed in casing 3', and in chamber 16' in casing 3", inserted between the shaft 2 of the pump and the shaft 12 co-axial with it, of which it is desired to measure the angular velocity, comprises two discs 13 and 15, mounted respectively at the ends of said shafts and invariably connected with them. Two diametrically opposed points of the discs are permanently connected by means of an oblique rod 14, carrying at O a spherical articulated bearing capable of oscillating in a suitable bearing provided on an intermediate diaphragm 18. This articulated bearing is caused to be tight with respect to chamber 16, communicating with the inside of the pump, by means of an elastic rubber cap 17, shaped as a truncated cone, which is held at its larger base between the support 19 of the intermediate diaphragm and a conical clamping ring 20, and at its smaller base between a conical boss 21 on the end of rod 14 and a cap 22 of corresponding shape screwed thereon.

It is to be understood that the ratios between the sizes of the aspiration and compression chambers of the pump must be selected, in relation with the usual velocities, so as to render the oscillations of the liquid levels in the tube branches 5, 6, practically unobservable, during the passage of two successive chambers in correspondence with the aspiration and compression tubes.

Similarly the stability of said levels remains perfect, if a turbine or a centrifugal pump are used, instead of a pump as described, for the maintainance of the pressure difference in the two branches of the gauge.

The device described, being of the sliding vane type of pump, which as is well known, does not operate with an absolute tightness, but has a certain amount of leakage between the vanes and the casing, the amount of leakage depending upon the speed of the pump rotor and consequently said leakage is also a function of the difference of pressure occurring between the tubes of the gauge, and renders the device operative.

Lastly, it will be obvious that the shaft 12 may be an auxiliary shaft, instead of the shaft whose angular velocity is to be measured, these two shafts being connected with a known ratio of velocities.

I claim:

1. In a tachometer of the pressure difference type, comprising a pump adapted to be driven by the shaft whereof the number of revolutions is to be ascertained, and a casing interiorly provided with two spaced partitions dividing the casing into three chambers and said pump being completely isolated from effects of the outside atmosphere by means of an elastic tight coupling in one chamber provided with an oblique transmission rod, the combination, with ends of two shafts for said coupling, of connecting means connecting the ends of said oblique transmission rod to the ends of said two shafts including two discs fixed upon said ends of the shafts, a spherical articulated bearing means providing for oscillation of said oblique rod mounted adjacent to the one interior partition of said one chamber, and means providing an air tight closure about said oblique rod and the spherical articulated bearing means including a boss upon said rod and a conical rubber hood having the smaller end clamped against said boss and the larger end secured to said one interior partition.

2. Tachometer according to claim 1, wherein the pump is of the sliding vane type, in which the depression and compression chambers are respectively connected by means of tubes to two branches of a gauge tube, the pressure variation indicated thereon varying with the amount of slip or leakage of air occurring between said compression and depression chambers in the pump, which leakage is a function of the speed of rotation of the pump.

UGO CIAMBERLINI.